(12) United States Patent
Del Fabro

(10) Patent No.: US 11,458,525 B2
(45) Date of Patent: Oct. 4, 2022

(54) MACHINE AND METHOD TO WORK METAL PRODUCTS

(71) Applicant: M.E.P. Macchine Elettroniche Piegatrici S.P.A., Reana del Rojale (IT)

(72) Inventor: Giorgio Del Fabro, Udine (IT)

(73) Assignee: M.E.P.—MACCHINE ELETTRONICHE PIEGATRICI S.P.A., Reana del Rojale (IT)

( * ) Notice: Subject to any disclaimer, the term of this patent is extended or adjusted under 35 U.S.C. 154(b) by 89 days.

(21) Appl. No.: 17/040,202

(22) PCT Filed: Mar. 26, 2019

(86) PCT No.: PCT/IT2019/050065
§ 371 (c)(1),
(2) Date: Sep. 22, 2020

(87) PCT Pub. No.: WO2019/186610
PCT Pub. Date: Oct. 3, 2019

(65) Prior Publication Data
US 2021/0008612 A1    Jan. 14, 2021

(30) Foreign Application Priority Data

Mar. 26, 2018  (IT) .......................... 102018000003971
Jan. 22, 2019  (IT) .......................... 102019000000947

(51) Int. Cl.
*B21D 7/08*        (2006.01)
*B21D 43/00*       (2006.01)
(Continued)

(52) U.S. Cl.
CPC ............. *B21D 43/006* (2013.01); *B21D 7/08* (2013.01); *B21D 43/285* (2013.01); *B65G 21/209* (2013.01); *B65G 2201/0217* (2013.01)

(58) Field of Classification Search
CPC ...... B21D 43/00; B21D 43/006; B21D 43/12; B21D 43/28; B21D 43/285; B21D 7/02;
(Continued)

(56) References Cited

U.S. PATENT DOCUMENTS 2,033,423 A * 3/1936 Frank .................... B21D 7/022
                                                        72/224
2,569,266 A * 9/1951 Thompson ............... B21D 7/10
                                                        72/166

(Continued)

FOREIGN PATENT DOCUMENTS

DE    3402568 A1    8/1985
DE    3505372 A1 *  8/1996 ............. B21D 43/12
(Continued)

OTHER PUBLICATIONS

Int'l Search Report and Written Opinion dated Jul. 22, 2019 in Int'l Application No. PCT/IT2019/050065.

*Primary Examiner* — Edward T Tolan
(74) *Attorney, Agent, or Firm* — Panitch Schwarze Belisario & Nadel LLP

(57) ABSTRACT

Machine to work oblong metal products, including a drawing apparatus to feed at least one of said metal products in a direction of feed and a work apparatus aligned in said direction of feed. The drawing apparatus includes a first drawing unit and a second drawing unit opposite each other with respect to said direction of feed. The first drawing unit and the second drawing unit define between them, in said direction of feed, a drawing channel for the at least one metal product. The drawing channel has a lying plane, defined by a plurality of anchoring inserts, for the at least one metal product, a supply apparatus being possibly present upstream of said drawing apparatus.

22 Claims, 10 Drawing Sheets

(51) Int. Cl.
*B21D 43/28* (2006.01)
*B65G 21/20* (2006.01)

(58) Field of Classification Search
CPC .......... B21D 7/022; B21D 7/024; B21D 7/08;
B21D 11/12; B26D 3/16; B26D 3/161
See application file for complete search history.

(56) References Cited

U.S. PATENT DOCUMENTS

| | | | | |
|---|---|---|---|---|
| 2,642,280 | A | * | 6/1953 | Fisk ..................... B21B 39/006 104/178 |
| 3,225,992 | A | * | 12/1965 | Ungerer .............. B21C 47/3416 226/170 |
| 4,000,636 | A | * | 1/1977 | Shubin ................... B21D 7/08 72/251 |
| 4,635,512 | A | * | 1/1987 | Wengenroth ......... B21D 43/285 83/156 |
| 5,136,867 | A | * | 8/1992 | Zuger ................... B21F 33/025 72/426 |
| 7,260,969 | B2 | * | 8/2007 | Del Fabro .............. B21D 11/12 72/307 |
| 7,721,582 | B2 | * | 5/2010 | Speck ..................... B21D 7/12 72/305 |
| 2007/0017271 | A1 | * | 1/2007 | Anagnostopoulos ..... B21F 1/00 72/307 |
| 2017/0260005 | A1 | * | 9/2017 | Eichner .................... B21C 1/30 |

FOREIGN PATENT DOCUMENTS

| | | | |
|---|---|---|---|
| EP | 1090696 | A2 | 4/2001 |
| EP | 1595612 | A1 | 11/2005 |
| EP | 3216537 | A2 | 9/2017 |
| GB | 1450136 | A * 9/1976 | ............ B21D 43/12 |

* cited by examiner

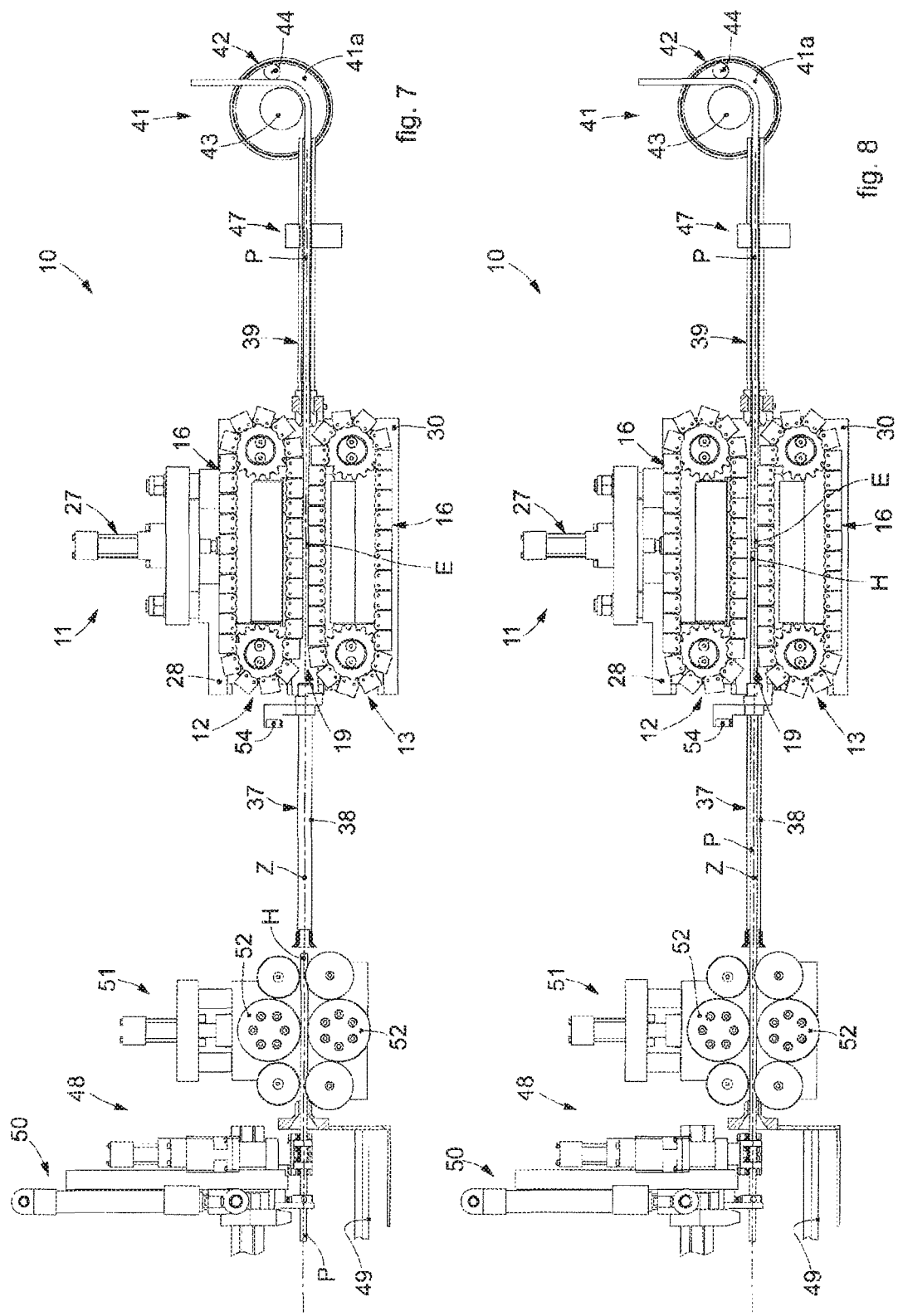

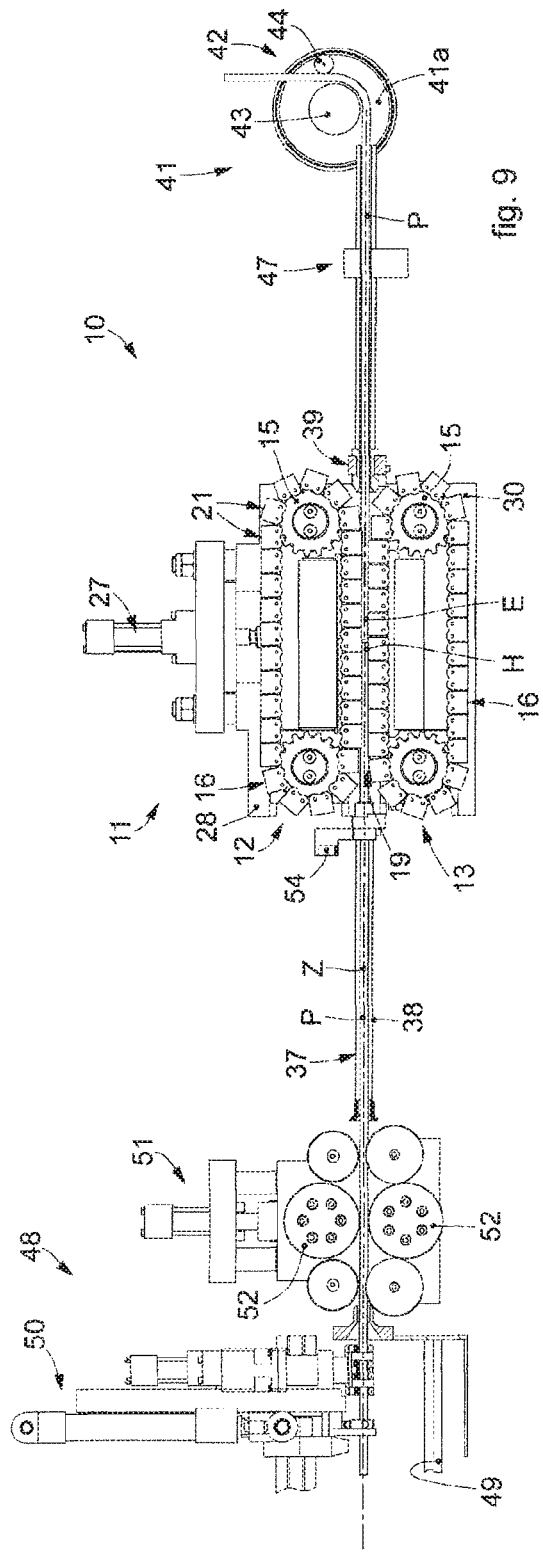
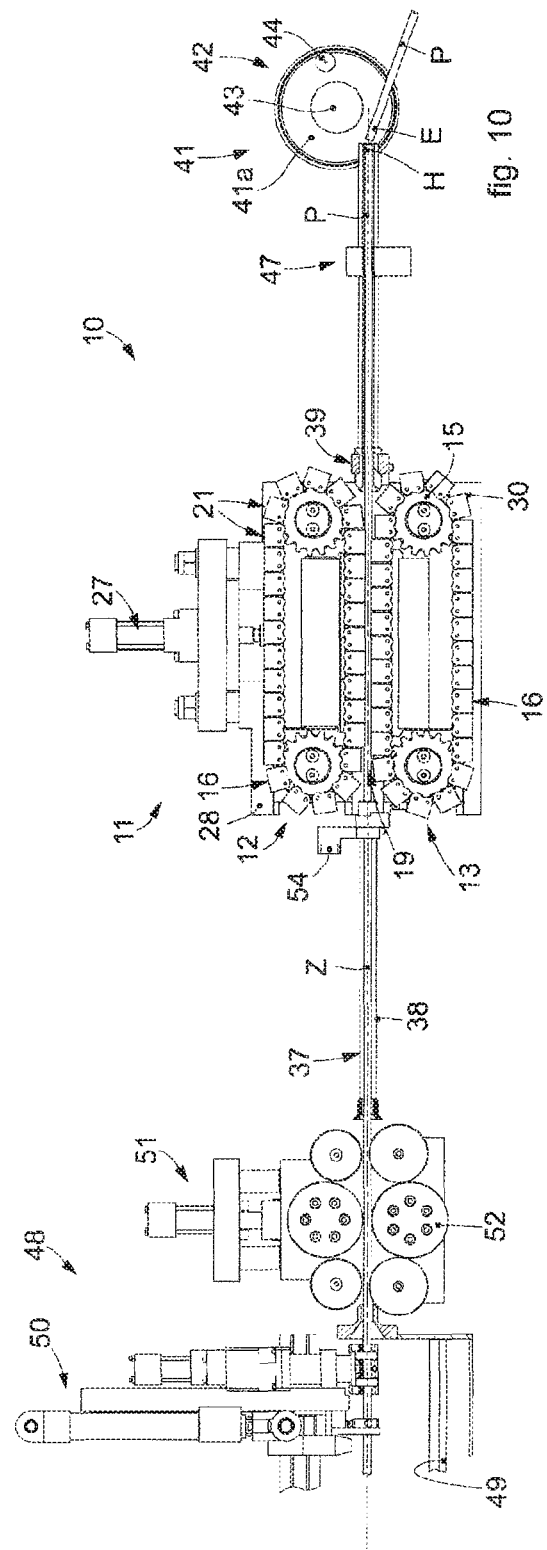

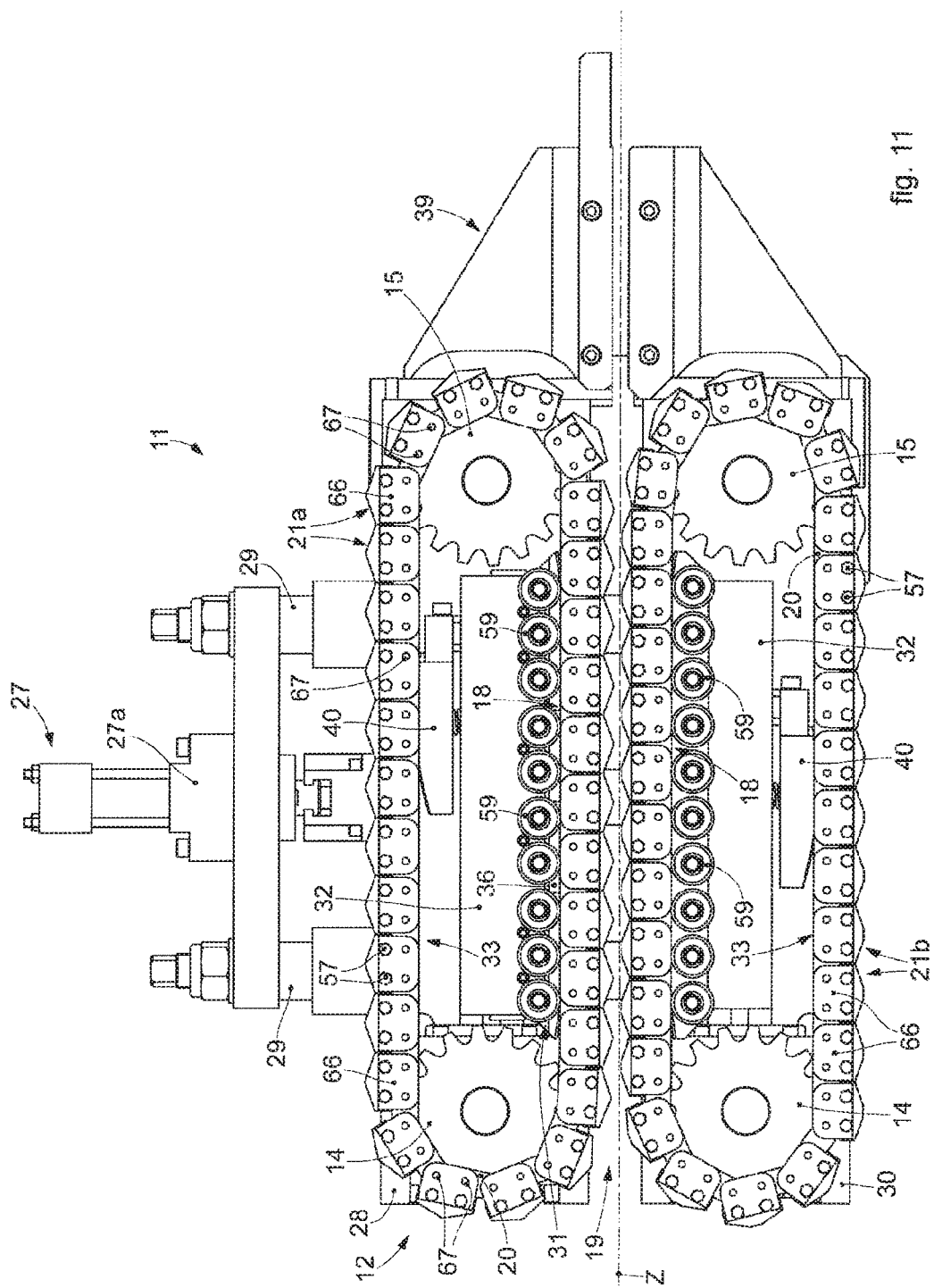

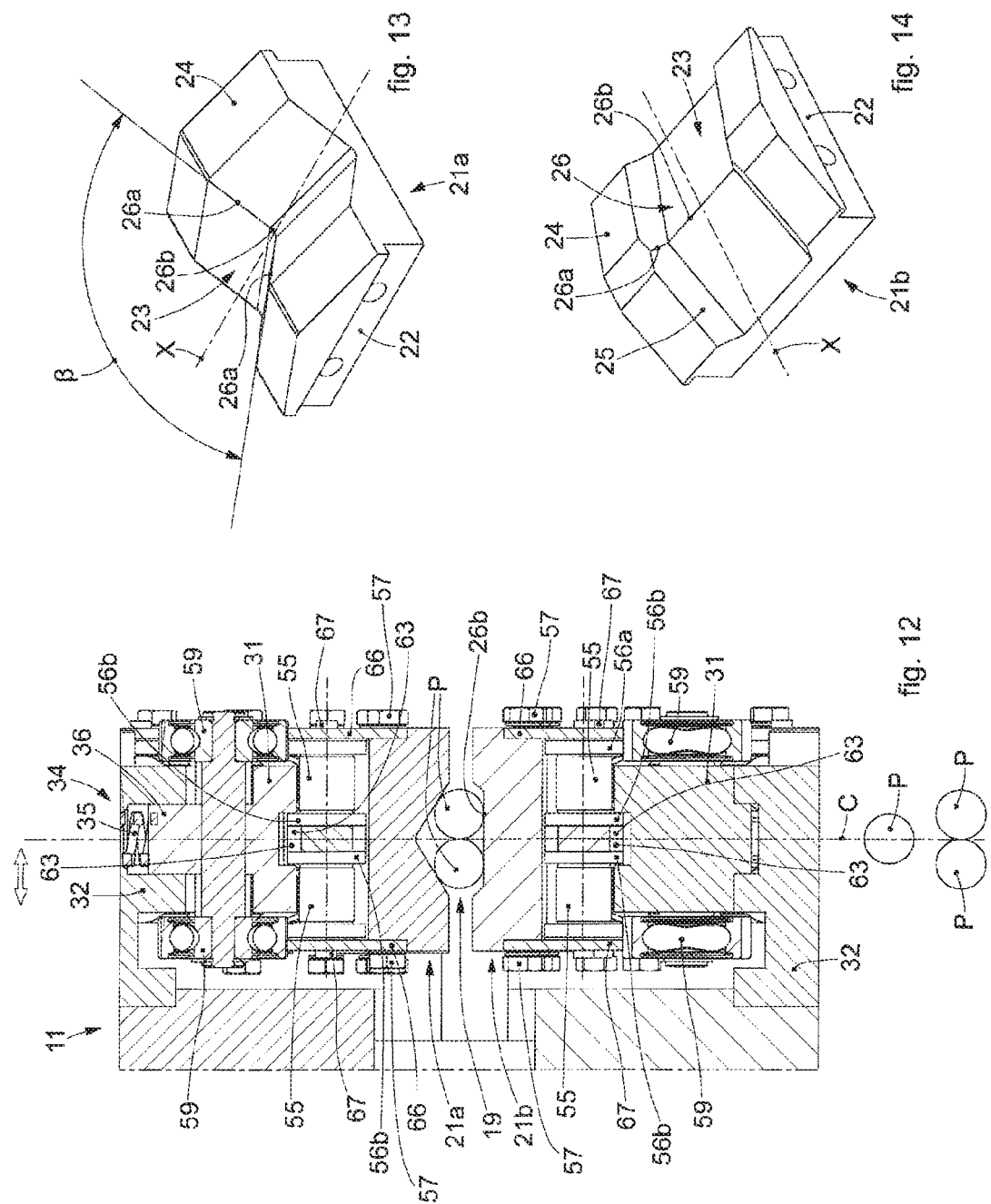

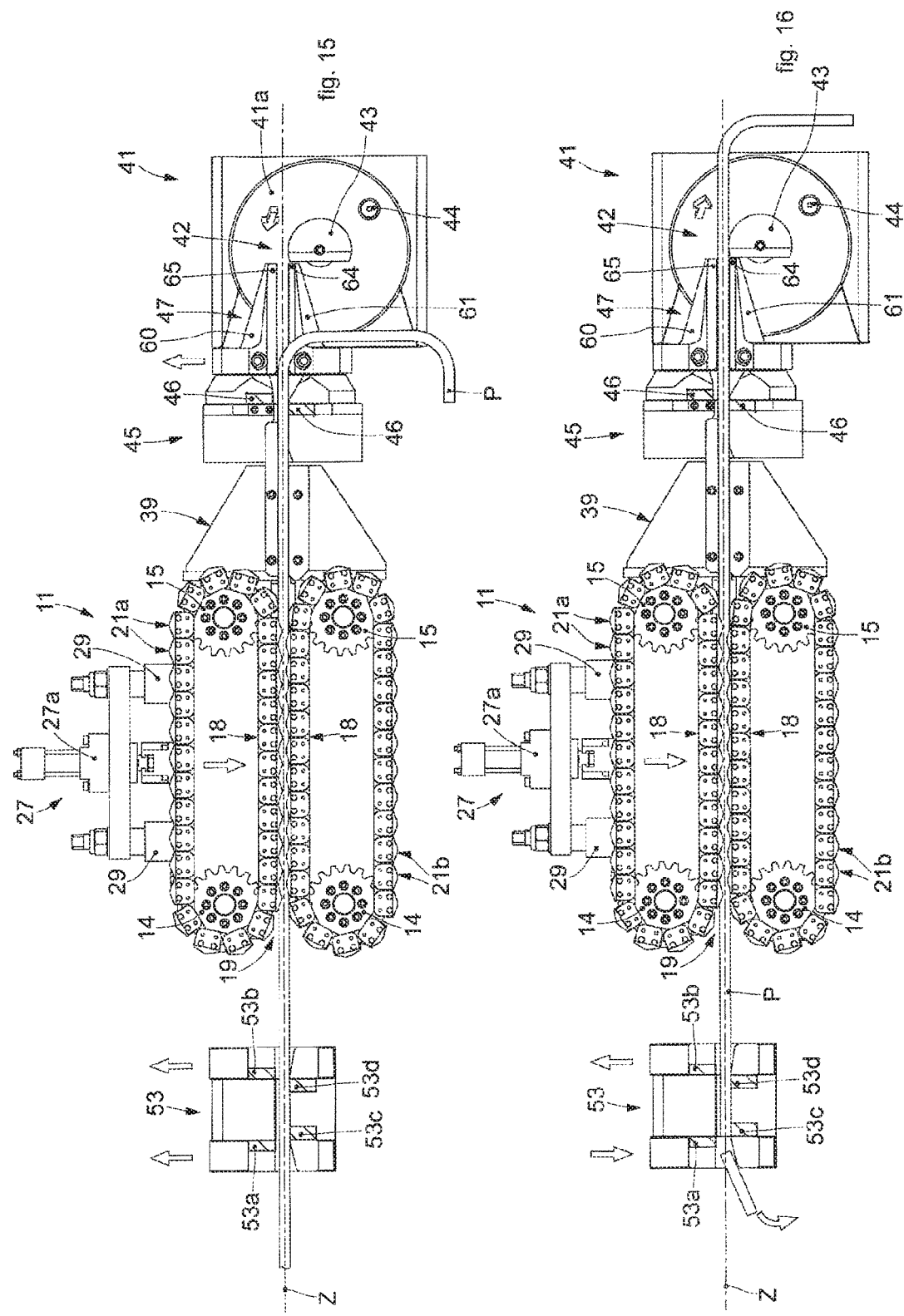

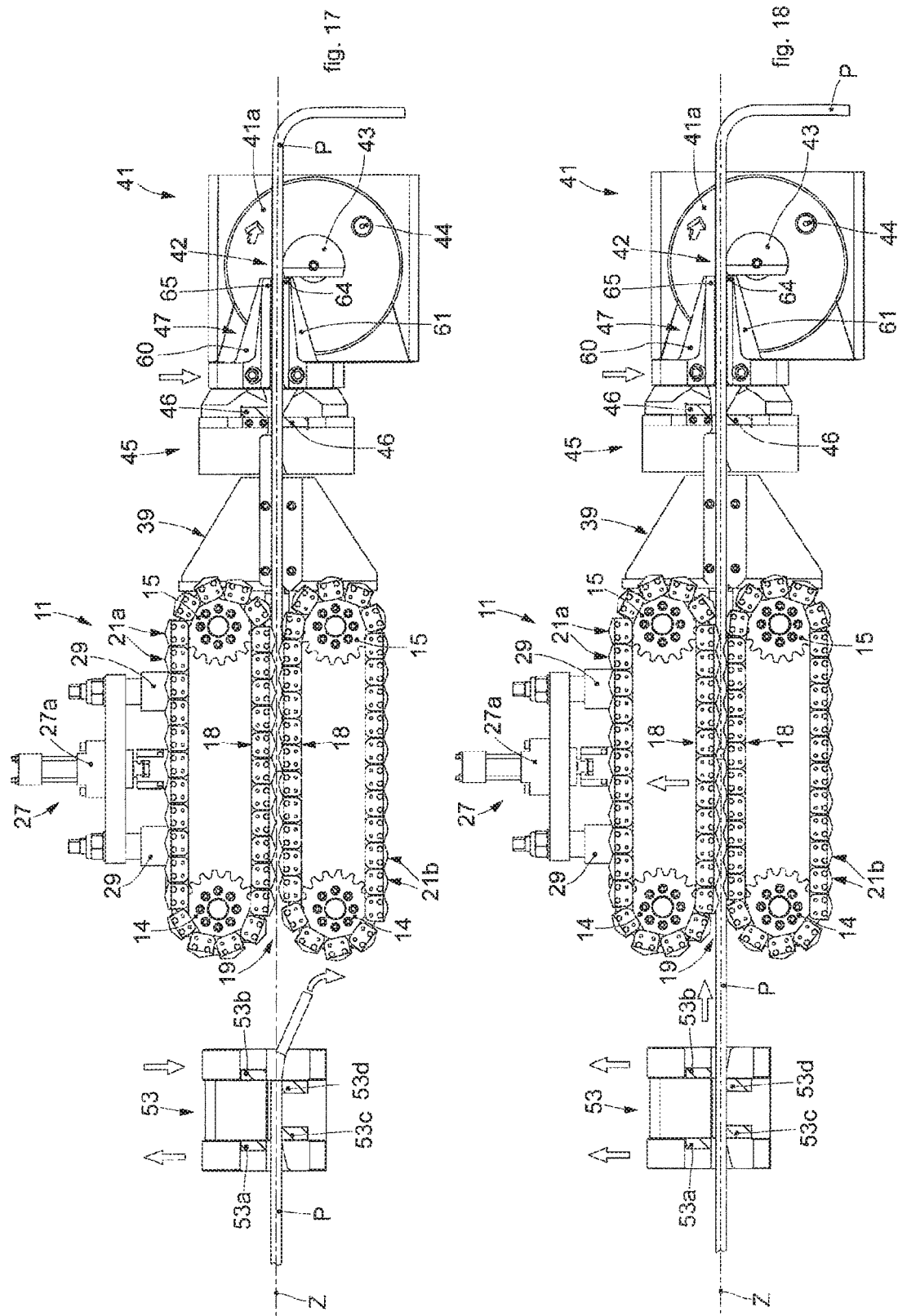

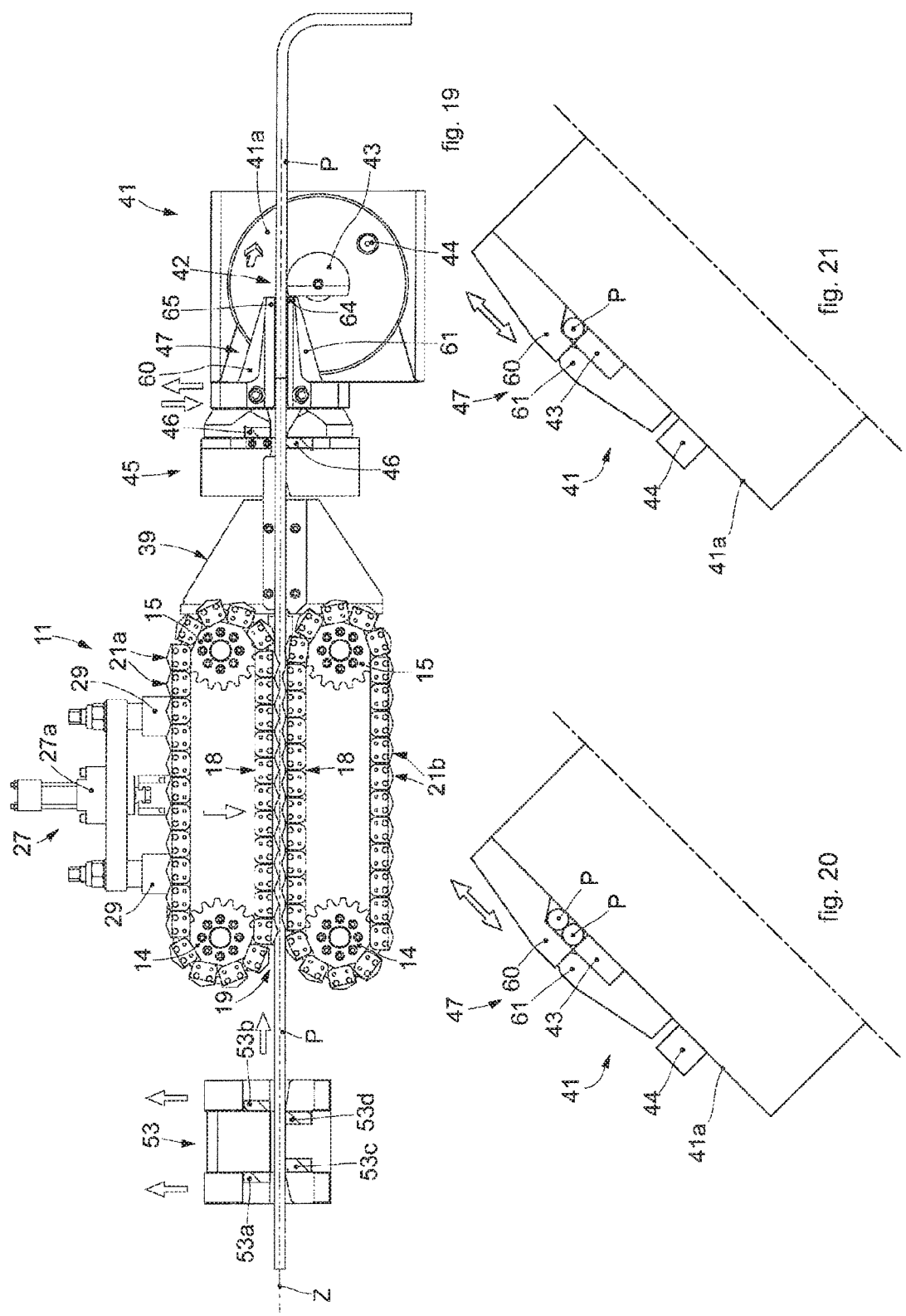

MACHINE AND METHOD TO WORK METAL PRODUCTS

CROSS-REFERENCE TO RELATED APPLICATIONS

This application is a Section 371 of International Application No. PCT/IT2019/050065, filed Mar. 26, 2019, which was published in the English language on Oct. 3, 2019, under International Publication No. WO 2019/186610 A1, which claims priority under 35 U.S.C. § 119(b) to Italian Application No. 102018000003971, filed Mar. 26, 2018, and Italian Application No. 102019000000947, filed Jan. 22, 2019, the disclosures of each of which are incorporated herein by reference.

FIELD OF THE INVENTION

The present invention concerns a machine and a method to work metal products such as, by way of example only, the bending and/or shaping of metal products to produce brackets and similar or comparable accessories for the building trade.

Here and hereafter in the description, the term metal products means metal products intended for brackets, and otherwise, clamping elements, connection or joining elements, advantageously but not exclusively for the building trade.

The metal products can be obtained starting from bars, section bars, round pieces, reinforcement round pieces, rods or suchlike.

BACKGROUND OF THE INVENTION

Machines suitable to obtain the various types of brackets required by the building trade, but not only, are known.

The machines generally comprise a drawing apparatus and a work apparatus which can comprise, for example, a bending device.

It is known that the work apparatus is located downstream of, and is aligned with, the drawing apparatus, to perform the required workings.

The drawing apparatus can be fed manually, or automatically, and is generally suitable to move linear metal products.

The metal products have a nominally round section, but can also have a square or sub-square section.

It is known that the metal products are obtained by rolling and it is also known that, depending on how they are made, the surface morphological configuration of the metal products is substantially parallel to the axis.

In certain production methods, the metal products have a morphological configuration that winds along the axis.

The drawing apparatus advances, toward the work apparatus, on each occasion and in a controlled manner, the desired length of metal product which, on each occasion, is to be processed.

Normally, there is a cutting unit between the drawing apparatus and the work apparatus.

The drawing apparatus generally consists of at least a pair of opposite rollers, at least one of which is motorized to feed the metal product toward the work apparatus.

It is also known that the metal products often have internal stresses, induced by previous workings, for example rolling, drawing or extrusion.

The internal mechanical stresses can remain dormant until a subsequent working of the metal product, for example a simple bending.

One of the problems that often occur in such products, during said processes, is the uncontrolled and unwanted deformation of the metal product which, on the one hand generates management problems and on the other leads to a finished product that is unsuitable for the purpose.

To overcome these shortcomings, machines to work metal products have been made which comprise two or more drawing apparatuses disposed in series.

The combination of several drawing apparatuses allows to have greater control of the drawing of the metal product. It also allows to contain the undesired deformation of the metal product.

These solutions, however, make the work machine more complex, creating management and control problems.

Furthermore, this solution is particularly expensive due to the high number of apparatuses required and to the need for correct coordination and control.

Furthermore, to avoid the onset of such deformations, the drawing apparatuses, which use rollers, are suitable to exert a high retaining pressure on the metal product.

The retaining action allows, for example, to contain the torsions of the metal product, at the same time hoping to be able to guarantee drawing even where the section of the metal product is different from the theoretical one.

In the case of drawing apparatuses that use caterpillar systems, the pressure between the tracks is not always sufficient.

However, it is known that the high retaining pressures can cause surface damage to the metal product. Moreover, they are not always able to guarantee a correct drawing.

It is also known that, in the case where two metal products are worked together, not even the high pressure is able to guarantee a uniform and identical, as well as simultaneous, feed of the two metal products.

One purpose of the present invention is to provide a machine to work metal products which allows to obtain finished products of high quality of size and shape.

Another purpose of the present invention is to provide a machine to work metal products that is economical.

Another purpose of the present invention is to be able to work two metal products simultaneously.

Another purpose of the present invention is to simplify the machine.

Another purpose of the present invention is to provide a machine to work metal products that is simple to control and manage.

Another purpose of the present invention is to provide a work machine which does not damage the metal products being processed.

Another purpose of the present invention is also the possibility of working metal products obtaining the widest range of construction products.

Another purpose is to be able to work metal products that, when finished or semi-finished, have a greatly reduced tail end.

According to the invention it is also possible to work metal products so that the tail end of the bracket is comprised between 3 cm and 10 cm, advantageously between 4 cm and 7 cm, more advantageously about 5 cm.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, a machine to work oblong metal products comprises a drawing apparatus configured to feed at least one of the metal products in a direction of feed, and a work apparatus.

The work apparatus is provided with a work plane in which a bending device is present provided with a contrast element, advantageously having at least one cylindrical vertical wall, and with a bending element.

The work apparatus is positioned downstream of the drawing apparatus, aligned in the direction of feed.

The drawing apparatus comprises a first drawing unit and a second drawing unit opposite each other with respect to the direction of feed.

The machine also comprises at least one drive member to move the drawing apparatus.

The first drawing unit and the second drawing unit define between them, in the direction of feed, a drawing channel for the at least one metal product.

The drawing channel has a lying plane, defined by a plurality of anchoring inserts, for the at least one metal product, substantially tangent to the cylindrical vertical wall of the contrast element, and is coherent with the work plane.

An apparatus to supply the metal products can possibly be present upstream of the drawing apparatus.

According to one aspect of the present invention, at exit from the drawing channel, the machine has guide means, advantageously adjustable on the plane substantially orthogonal to the lying plane of the drawing channel, followed by a main cutting unit and the bending device.

The drawing apparatus has at least one position adjustable in a direction orthogonal to the direction of feed with respect to the work plane, so that the position of the at least one metal product is coherent with the work plane.

According to one embodiment, the first drawing unit and the second drawing unit each comprise a first wheel and a second wheel and a chain wound in a closed ring between the first wheel and the second wheel.

The drawing channel comprises an opposite plurality of upper anchoring inserts and lower anchoring inserts.

The lower anchoring inserts have a flat transverse seating, an aligned plurality of which constitutes the lying plane for the at least one metal product, to define the vertical positioning of the at least one metal product.

The upper anchoring inserts have a rounded transverse profile such that a reciprocal thrust is applied on the metal products toward the central longitudinal axis of the drawing channel, parallel to the direction of feed, and toward the lower anchoring inserts.

According to a variant embodiment, the first drawing unit and the second drawing unit have a plurality of drawing wheels aligned in the direction of feed.

The drawing wheels are adjustable to define the height of the drawing channel. The drawing channel is defined at the lower part by the transverse seatings which define the vertical positioning of the at least one metal product, and at the upper part by a rounded transverse profile.

According to another aspect of the present invention, upstream of the drawing apparatus there is a secondary cutting unit configured to perform, on each occasion, the head-wise or tail-wise butting of the at least one metal product.

The secondary cutting unit is the bilateral type and comprises opposite cutting means consisting of two upper cutting edges and two lower cutting edges, a first pair, upper and lower, of which is configured to perform the cutting of the head end of the at least one metal product, the other pair is configured to perform the cutting of the tail end of the metal product.

According to another aspect of the present invention, at exit from the main cutting unit there are guiding and holding means consisting of branches.

The guiding and holding means lie on the same plane and are autonomous and advantageously adjustable, directly cooperating with the bending device.

The guiding and holding means have profiles with an extension which reaches the proximity of the center of the contrast element of the bending device.

The contrast element has a cylindrical portion with an axis of rotation and a flat portion close to the axis of rotation, the flat portion facing the guiding and holding means.

A first branch, which cooperates directly with the contrast element, has a wall substantially orthogonal to the work plane and substantially tangent to the cylindrical vertical wall of the contrast element, cooperating with the flat portion of the contrast element.

In the part that faces the wall substantially orthogonal to the work plane of the first branch, the other branch has an extension toward the first branch such that a thrust is exerted downward and toward the first branch.

The guiding and holding means and at least the contrast element are mobile to retract with respect to the work plane, between a working condition and a condition of non-interference.

The branches face each other and are positioned at an adjustable distance to each other in order to pass from a gripping position, which allows the clamping and axial positioning of the at least one metal product at least during the bending operation, to a release and guiding position of the at least one metal product, so that it can move.

According to one aspect of the present invention, the profile of the guiding and holding means is reduced in the direction of the contrast element, having a substantially flared shape in the direction of feed.

According to another aspect of the present invention, at least the upper anchoring inserts are provided with a gripping groove, for the at least one metal product, defined by tapered portions which from the sides narrow toward a central portion. The central portion of the gripping groove comprises inclined sides and the seating, defined by the rounded profile, located between them.

According to another aspect of the present invention, the upper anchoring inserts and the lower anchoring inserts cooperate laterally with anchoring links.

The anchoring links support and position the chains, the chains being sliding on contrasting bodies of the first drawing unit and of the second drawing unit.

At least one of the contrasting bodies cooperates elastically with a respective support body by means of elastic elements.

The present invention also concerns a method to work at least one metal product which uses the machine described above.

In particular, when the last bend is to be made on a metal product, a following metal product is used to axially position the preceding metal product in correspondence with the bending device and the guiding and holding means are driven to at least temporarily act also as a contrast element during the bending.

According to one aspect of the present invention, in order to retract the at least one metal product, which has at least one bend in a position of interference with the guiding and holding means and/or with the bending device, the guiding and holding means and the bending device are lowered, allowing the metal product to retract until it is in the proximity of the main cutting unit.

Furthermore, to make a shaped product with the metal product which has the end segment of the last bend comprised between 4 cm and 7 cm, the metal product is retracted, after the guiding and holding means and the bending device have retracted from the work plane, before the main cutting unit intervenes to separate the shaped product from the metal product.

BRIEF DESCRIPTION OF THE DRAWINGS

These and other characteristics of the present invention will become apparent from the following description of some embodiments, given as a non-restrictive example with reference to the attached drawings wherein:

FIGS. 7-10 show a sequence of operating steps for working the metal product with the work machine of FIG. 1;

FIG. 11 is a variant of FIG. 2;

FIG. 12 is a section view of a detail of FIG. 11;

FIG. 13 is a perspective view of a component of FIG. 11;

FIG. 14 is a perspective view of another component of FIG. 11;

FIGS. 15-19 show a sequence of operating steps for working the metal product according to the variant of FIG. 11;

FIGS. 20-21 show a schematic lateral view of the work apparatus of FIGS. 16-19.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

Figure 1:
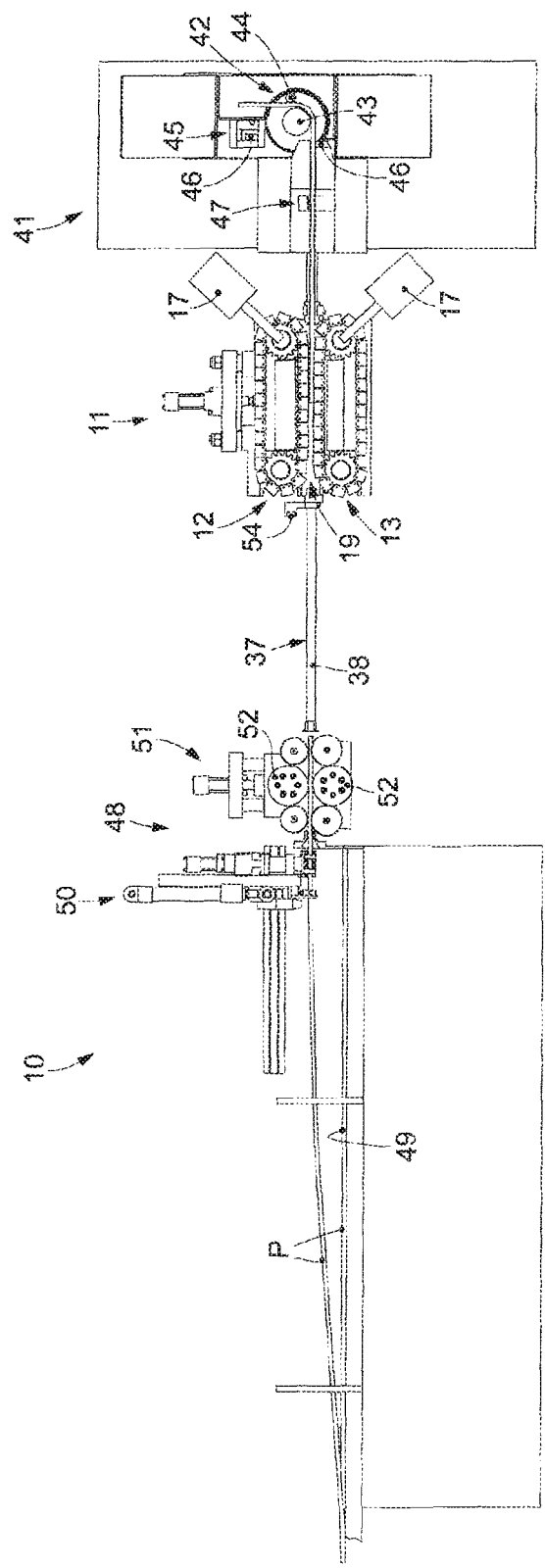
FIG. 1 is a schematic view of a machine to work metal products in accordance with the present invention.

In accordance with some embodiments of the present invention provided by way of non-restrictive example, a machine to work oblong metal products is indicated as a whole by the reference number 10.

The work machine 10 comprises at least one drawing apparatus 11, configured to feed at least one of the metal products P in a direction of feed Z, and a work apparatus 41 positioned downstream of the drawing apparatus 11, aligned in the direction of feed Z.

The work apparatus 41 is provided with a work plane 41a, in which there is a bending device 42 provided with a contrast element 43 and a bending element 44 mobile with respect to the contrast element 43 to determine the bending of the at least one metal product P around the bending element 44.

In accordance with the embodiment shown in FIGS. 15-19, the contrast element 43 has a cylindrical portion, having at least one cylindrical vertical wall with an axis of rotation, orthogonal to the work plane 41a, with respect to which the bending element 44 can rotate to determine the desired bends on the metal products P.

The contrast element 43 also has a flat vertical portion close to the axis of rotation.

The work plane 41a of the work apparatus 41 can be horizontal, sub-vertical or vertical.

Preferably, the work plane 41a of the work apparatus 41 is inclined between about 30° and about 50°, normally round about 45° (FIGS. 20 and 21) to promote the discharge, by gravity, of the shaped elements just made.

The drawing apparatus 11 comprises a first drawing unit 12 and a second drawing unit 13 opposite each other with respect to the direction of feed Z and at least one drive member 17 to move them.

The first drawing unit 12 and the second drawing unit 13 are parallel to each other and define, between them and in the direction of feed Z, a drawing channel 19 for the at least one metal product P.

The drawing channel 19 has a lying plane, defined by a plurality of anchoring inserts 21, for the at least one metal product P, substantially tangent to the cylindrical vertical wall of the contrast device 43, and coherent with the work plane 41a.

The drawing channel 19 can have a width coherent with a multiple of the section of the metal product P.

There can be a supply apparatus 48 of the metal products P upstream of the drawing apparatus 11, as will be shown in a preferential embodiment.

In accordance with one aspect of the present invention, at exit from the drawing channel 19, the machine 10 has guide means 39, advantageously adjustable on the plane substantially orthogonal to the lying plane of the drawing channel 19, followed by a main cutting unit 45, configured to cut the at least one metal product P to the desired size, and by the bending device 42.

The main cutting unit 45 comprises cutting blades 46 in which, according to a preferential solution, at least one of the cutting blades 46 is mobile with respect to the other to perform the cutting action of the metal product P.

At exit from the main cutting unit 45, guiding and holding means 47 are present, lying on the same plane, autonomous, advantageously adjustable, and cooperating directly with the bending device 42 to allow the desired bends to be made on the metal product P.

The guiding and holding means 47 also cooperate with the guide means 39 to correctly position the metal product P in the desired position during the working steps thereof.

The guiding and holding means 47 have profiles with an extension that reaches the proximity of the center of the contrast element 43 of the bending device 42.

The guiding and holding means 47 have an elongated profile in the direction of feed Z, toward the center of the contrast element 43, to allow to hold the at least one metal product P and to allow the bending also of its end portions.

In particular, the guiding and holding means 47 are substantially parallel to the work plane 41a of the work apparatus 41.

The profile of the guiding and holding means 47 advantageously decreases in the direction of the contrast element 43, having a substantially flared shape in the direction of feed Z.

This allows to reduce their weight and bulk, at least during the bending process.

The guiding and holding means 47 comprise a pair of branches 60, 61 facing each other and positioned at an adjustable distance from each other in order to pass from a gripping position, which allows the clamping and axial positioning of the at least one metal product P at least during the bending operation, to a release position of the at least one metal product P, for example to move it with the drawing apparatus 11.

For this purpose, at least one of the branches 60, 61 is mobile in a direction orthogonal to the direction of feed Z.

According to the embodiment shown in FIGS. 15-19, the branch 60 is mobile and the branch 61 is fixed. However, it is not excluded that the branch 60 can be fixed and the branch 61 mobile, or both can be mobile.

In the configuration shown in FIGS. 20 and 21, the branch 61 is fixed and, if the work plane 41a is inclined, it is configured to act as a support for the at least one metal product P which, by gravity, tends to rest on it.

For this purpose the branch 61 is provided with a wall substantially orthogonal with respect to the work plane 41a and substantially tangent to the cylindrical vertical wall of the contrast element 43, cooperating with the flat portion thereof.

In the part facing the wall substantially orthogonal to the work plane 41a of the branch 61, the mobile branch 60 has an extension toward the latter such that a thrust is exerted downward and toward the branch 61.

This solution is particularly useful in the case of two metal products P.

With this configuration, the at least one metal product P is always aligned with the contrast element 43, thus allowing to obtain extremely precise bends.

The guiding and holding means 47 can be the replaceable type or the adjustable type so they can be adapted to the size and number of metal products P.

The branches 60, 61 have an elongated profile in the direction of feed Z and which is reduced in the direction of the contrast element 43. By way of example, the branches 60, 61 can have a prismatic profile with a triangular base.

This allows the bending element 44 to rotate around the contrast element 43 by a greater angle, thus being able to produce bends up to an angle of about 180°.

The branches 60, 61 have ends 64, 65 which, during use, are positioned at the smallest possible distance from the contrast element 43. In particular, the ends 64, 65 of the branches 60, 61 face the flat portion of the contrast element 43.

This configuration of the guiding and holding means 47 allows to make bends also on portions of the metal products P which have very small tail ends, up to about 5 cm.

In this way it is possible to reduce the work waste of the metal products P, increase productivity and at the same time avoid making end products that do not comply with the purpose.

The guiding and holding means 47 are mobile retractable with respect to the work plane 41a between a working condition, protruding, and a condition of non-interference, retracted, so as not to interfere with the movement of the metal products P, for example during the step when the shaped piece is retracted, as will be explained in more detail below.

The bending device 42 can also alternatively have a working condition and a condition of non-interference.

In particular, the contrast element 43 can be fixed or suitable to possibly have the working condition and non-interference condition in a manner coordinated, or not, with the guiding and holding means 47.

The conformation of the contrast element 43 allows the branches 60, 61 of the guiding and holding means 47 to have the respective ends 64, 65 arrive in close proximity to the center of the contrast element 43, thus allowing to guide the tail end of the at least one metal product P up to the minimum distance desired from the center of the contrast element 43.

Since in this case the tail end of the at least one metal product P can no longer be moved by the drawing apparatus 11, Applicant has perfected a method to feed and position the at least one metal product P, as will be shown in more detail below.

In accordance with the embodiments described here, the first drawing unit 12 and the second drawing unit 13 are the caterpillar type and advantageously, but not exclusively, are positioned on a single vertical or sub-vertical plane.

The first drawing unit 12, positioned above, is installed on a support slider 28 mobile orthogonally with respect to the direction of feed Z.

The second drawing unit 13, positioned below, is installed on a fixed support structure 30 and is opposite the first drawing unit 12.

The support slider 28 is associated with positioning and adjustment means 27 which support and position it with respect to the second drawing unit 13.

The positioning and adjustment means 27 move the first drawing unit 12 toward/away from the second drawing unit 13 in a direction orthogonal to the direction of feed Z, so as to define between them the drawing channel 19 for the at least one metal product P, exerting the drawing action thereon.

According to possible solutions of the invention, the positioning and adjustment means 27 can comprise a linear actuator, a screw jack, an electric actuator, an oil dynamic actuator, or other type.

Figure 2:
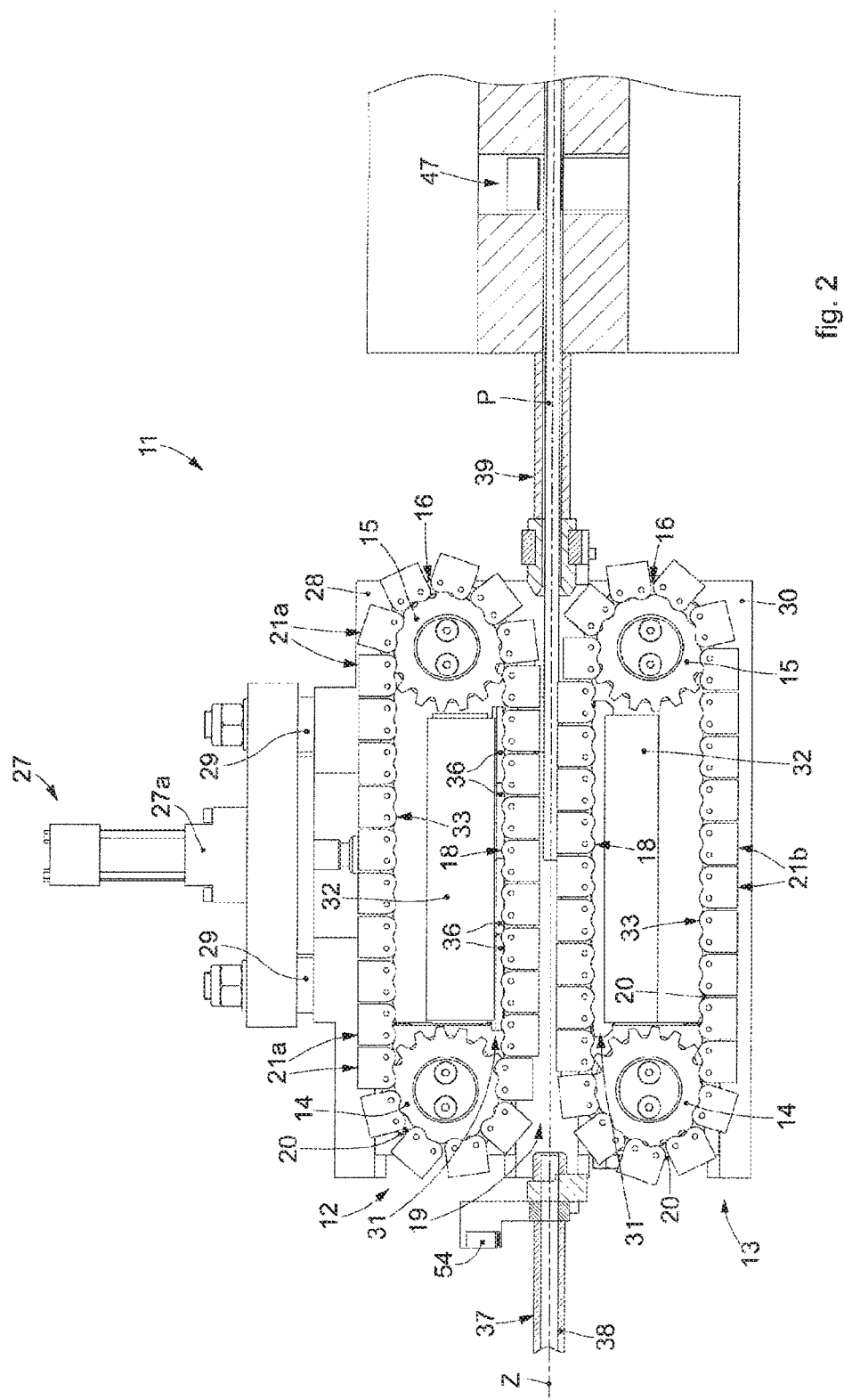
FIG. 2 is an enlarged schematic view of a detail of FIG. 1.
Figure 3:
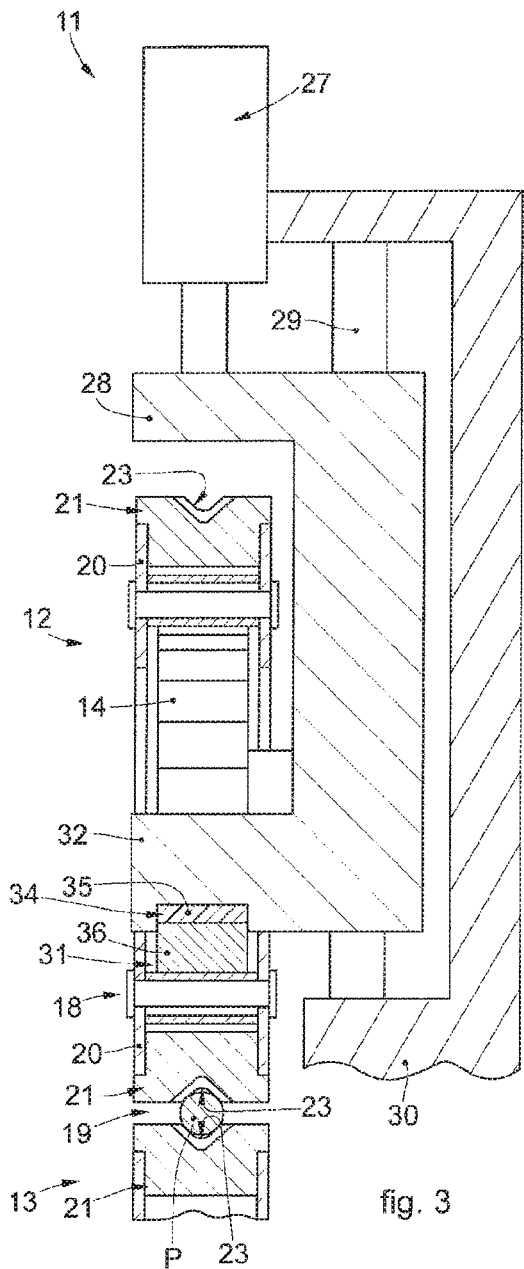
FIG. 3 is a schematic section view of a detail of FIG. 2.
Figure 4:
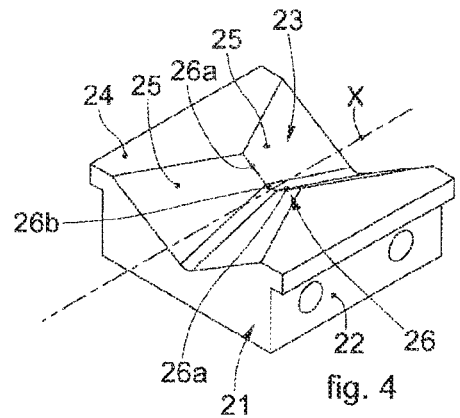
FIG. 4 is a perspective view of a component of FIG. 2.

In the solution shown by way of example in FIG. 2 and FIG. 11, the support structure 30 is advantageously fixed, the support slider 28 is advantageously associated with the positioning and adjustment means 27.

The positioning and adjustment means 27 comprise, by way of example, an actuator jack 27a which defines the correct position of the first drawing unit 12 with respect to the second drawing unit 13 and at the same time imparts the desired pressure on the metal product P.

The actuator jack 27a cooperates with guides 29 on which the support slider 28 of the first drawing unit 12 slides.

The drawing channel 19 is defined by an opposite plurality of anchoring inserts 21.

The drawing channel 19 is defined by an opposite plurality of upper 21a and lower 21b anchoring inserts respectively moved by the first drawing unit 12 and the second drawing unit 13.

The lower anchoring inserts 21b have at least one flat transverse seating 26b, an aligned plurality of which constitutes the lying plane for the at least one metal product P, to define the vertical positioning of the at least one metal product P.

The upper anchoring inserts 21a have centering and clamping means which have a rounded transverse profile such that on the metal products P a reciprocal thrust is applied toward the longitudinal central axis of the drawing channel 19 and toward the lower anchoring inserts 21b.

In the drawing channel 19 the upper anchoring inserts 21a can face the lower anchoring inserts 21b.

According to a preferential variant, shown in FIG. 2 and FIG. 11, the upper anchoring inserts 21a and the lower anchoring inserts 21b are offset in the direction of feed Z by a desired value, in order to improve the drawing effect of the metal product P without creating surface, linear, or other, deformations thereon.

In the case of two or more metal products P, the profile of the upper anchoring insert 21a is such as to impart a thrust on the metal products P in a transverse direction with respect to the direction of feed Z toward the center of the drawing channel 19.

The drawing channel 19 is configured to generate a desired holding action on a longitudinal portion of the metal products P, an action which allows to maintain their linearity and guarantee a correct feed action in every situation.

According to the embodiments described here, the first drawing unit 12 and the second drawing unit 13 each comprise a first wheel 14, a second wheel 15, distant from each other, and a chain 16 wound in a closed ring between the first wheel 14 and the second wheel 15.

The chains 16 each define at least one respective first return segment 18, comprised between the first wheel 14 and the second wheel 15.

The first return segments 18 of both chains 16 are parallel and opposite the direction of feed Z to define between them the drawing channel 19 for the at least one metal product P.

The first drawing unit 12 and the second drawing unit 13 can also comprise tensioning means 40 of the chain 16, to guarantee a correct drawing action and at the same time to facilitate assembly, disassembly and maintenance thereof.

A contrasting body 31 is associated with at least one of either the first drawing unit 12 or the second drawing unit 13, advantageously with both, to exert a thrusting action toward the metal product P so as to ensure it is correctly drawn.

The contrasting body 31 advantageously covers at least the entire length of the drawing action.

The length of the drawing action is intended as the length of the return segment 18 and therefore of the chain segment 16 which imparts the drawing action on the at least one metal product P.

In the case provided here by way of example, the contrasting body 31 cooperates with a support body 32 associated stably with the support slider 28 and with the support structure 30 of the first drawing unit 12 and of the second drawing unit 13 respectively.

Between the contrasting body 31 and the support body 32 elastic elements 34 can be present, provided to impart an elastic thrust on the metal product P, in the case where the metal product P does not have a constant section.

The elastic elements 34 can be of any type, for example an elastic body 36, one or more springs 35, or a combination of an elastic body 36 and one or more springs 35.

According to embodiments described here, advantageously but not exclusively, the drive member 17 determines the movement of the two chains 16.

According to a variant, the first drawing unit 12 and the second drawing unit 13 can be driven by independent but coordinated drive members 17 or by a single drive member 17.

The first wheel 14 or the second wheel 15 is equipped to guarantee the desired drawing action on the chain 16 so as to make it advance linearly at the desired speed.

Each chain 16, in the example shown in FIG. 2 and FIG. 11, is defined by coordinated link elements 20, which cooperate respectively with the first wheel 14 and the second wheel 15 of the first drawing unit 12 and second drawing unit 13.

In the solution given here by way of example, the chains 16 are provided with anchoring inserts 21 installed one adjacent to the other, along the development of the chains 16, and the profile of which is configured to define the drawing channel 19 which performs the gripping action on the at least one metal product P.

Each anchoring insert 21, in this case, is attached integral to at least two consecutive link elements 20 of the chain 16.

The chain 16 comprises a ring-shaped succession of link elements 20a, 20b reciprocally connected by support and return links 63 by means of a pin 67.

The link elements 20a, 20b respectively comprise external links 56a and internal links 56b connected by the pin 67, coaxially to which rollers 55 run.

The chain 16 is supported and positioned by anchoring links 66. For this purpose, the linking elements 20a, 20b of the chain 16 are connected, on the opposite side to the one where they are connected to the support and return links 63, to the anchoring links 66 by the pin 67.

The anchoring inserts 21 cooperate laterally with the anchoring links 66. For this purpose, the anchoring links 66 support and position the respective anchoring inserts 21.

The anchoring links 66 are stably connected to the anchoring inserts 21 by attachment means 57. In this way it is possible to move the anchoring inserts 21 by means of the chain 16.

The chain 16 is slidable on the contrasting body 31. In particular, the rollers 55 of the chain 16 are configured to slide on the contrasting body 31 which, in this case, cooperates with the support body 32 by means of the elastic elements 34.

The contrasting body 31 supports and positions a plurality of sliding elements 59 on which the external links 56a and anchoring links 66 are configured to slide.

According to embodiments described here, each anchoring insert 21 can be provided with attachment portions 22 (FIGS. 4-6, FIGS. 13-14) for connection with the chain 16.

The attachment portions 22 define support planes for the anchoring links 66.

The attachment portions 22 can comprise, purely by way of example, holes, for example threaded for coupling with the attachment means 57 such as, purely by way of example, screws, pins, rivets, nails.

The anchoring insert 21 is provided with a base surface 24, part of which cooperates with the at least one metal product P and defines part of the drawing channel 19.

At least the upper anchoring inserts 21a are provided with a gripping groove 23, made on the base surface 24, in which a portion of the at least one metal product P is positioned on each occasion.

The gripping groove 23 extends through the length of the anchoring insert 21, along a longitudinal axis X which, during use, is parallel to the direction of feed Z.

The gripping groove 23 is advantageously defined by two tapered portions 25 which, from the sides, both narrow toward a central portion 26.

Advantageously, the tapers are both in a longitudinal and transverse direction of the base surface 24.

The central portion 26 can define a flat segment, that is, define a connection edge, or even a connection curve.

The tapered portions 25 can have flat faces, they can also have curved faces or also be defined by curves.

The conformation of the central portion 26 allows to define a narrowing of the cross section of the gripping groove 23, which allows to increase the gripping and holding efficiency exerted on the at least one metal product P.

For this purpose, the central portion 26 comprises two inclined sides 26a and a seating 26b located between them.

The seating 26b of the lower anchoring insert 21b defines the correct position of the metal product P with respect to the direction of feed Z.

If two or more metal products P are fed, the seating 26b is such as to correctly position them vertically.

In the case of one or more metal products P, the seating 26b of the upper inserts 21a is such that the metal products P are thrust toward the center and all positioned in lateral contact where they are clamped during drawing.

The drawing apparatus 11 has at least one position adjustable in a direction orthogonal to the direction of feed Z with respect to the work plane 41a, so that the position of the at least one metal product P is coherent with the work plane 41a.

The lying plane for the at least one metal product P, defined by the plurality of seatings 26b of the lower anchoring inserts 21b, must be correctly positioned with respect to the vertical wall of the contrast element 43 so that the at least one metal product P reaches the contrast element 43 tangent to the vertical wall.

The lying plane will therefore be substantially tangent to the vertical wall of the contrast element 43.

On each occasion, the lateral positioning of the drawing channel 19, because of the number of metal products P that it has to draw, will take into account the fact that the positioning of the metal product P must also be coherent with the work plane 41a of the bending device 42, so that at least one metal product P cooperates with the work plane 41a remaining substantially tangent to the vertical wall of the contrast element 43.

When the upper anchoring inserts 21a face the lower anchoring inserts 21b, their central portions 26 define a narrowing of the cross section of the drawing channel 19.

In this zone, the at least one metal product P is subjected to the desired pressure such that it ensures the grip for the correct drawing of the metal product P.

According to the first embodiment, shown in FIGS. 3-6, the drawing apparatus 11 is configured to feed a single metal product P in the direction of feed Z.

In this case, the upper anchoring inserts 21a and the lower anchoring inserts 21b, advantageously although not necessarily, are the same.

The metal product P moves along the drawing channel 19 always in contact with the inclined sides 26a of the upper 21a and lower 21b anchoring inserts which on each occasion define the drawing channel 19.

The seating 26b can have a rounded profile with a connection radius possibly smaller than the transverse size of the metal product P, so as to promote its contact with the lateral sides 26a.

According to the second embodiment, shown in FIG. 14, the drawing apparatus 11 is configured to feed two metal products P together in the direction of feed Z.

In this case, the shape of the tapered portions 25 and of the central portion 26 of the anchoring inserts 21 is configured to bring the two metal products P into contact, or substantially into contact.

In this case, the upper anchoring inserts 21a and the lower anchoring inserts 21b are advantageously different.

The upper anchoring inserts 21a have a seating 26b which has a rounded profile coherent with the transverse size of two paired metal products P, so as to promote their contact with the lateral sides 26a.

In this case, the metal products P are forced both to proceed in pairs, and to proceed one thrust against the other and to proceed at the same speed.

The lower anchoring inserts 21b have a seating 26b defined by a flat segment, advantageously by a straight edge on which the two metal products P rest.

The size of the seating 26b of the anchoring inserts 21b must be suitable to guarantee that the two metal products P fed are supported.

During use, the two metal products P are fed along the drawing channel 19 always in contact with the inclined sides 26a of the upper anchoring inserts 21a and resting on the seating 26b of the lower anchoring inserts 21b.

In this way, the two metal products P can advance side by side and thrust one onto the other by the constraining reaction generated by the contact with the inclined sides 26a of the upper anchoring inserts 21a.

According to embodiments described here, the tapered portions 25 are inclined, with respect to the longitudinal axis X, by a first angle of inclination α comprised between 10° and 45°, preferably between 15° and 30°.

Figure 5:
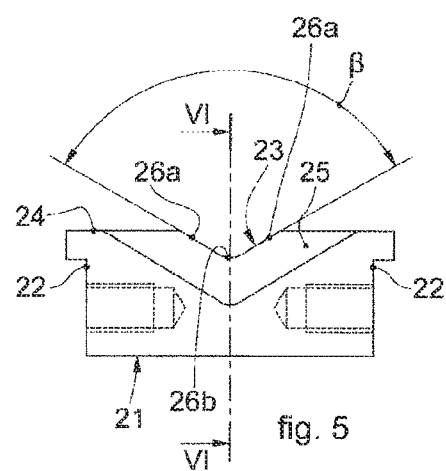
FIG. 5 is a front view of FIG. 4.
Figure 6:
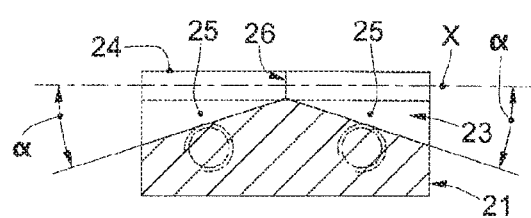
FIG. 6 is a section view along the line VI-VI of FIG. 5.

According to solutions shown in FIG. 5 and in FIG. 13, the gripping groove 23 is made with an angle of divergence β comprised between 80° and 150° (preferably between 90° and 120°) and symmetrical with respect to the central axis, which is orthogonal to the longitudinal axis X and lies on a plane orthogonal to the latter.

According to the second embodiment, if two metal products P are fed, the angle of divergence β is greater than when only one metal product P is fed.

According to embodiments described here, the shape of the tapered portions 25 prevents interference of the anchoring inserts 21 with the at least one metal product P in the zones of entry to and exit from the drawing apparatus 11.

The linking elements 20 of the chains 16 and/or the anchoring inserts 21, in correspondence with the first return segments 18, are positioned, during use, with one of their surfaces opposite the base surface 24, resting on the contrasting body 31 to exert pressure on the at least one metal product P.

The chains 16 of the first drawing unit 12 and the second drawing unit 13 can comprise a second return segment 33, comprised between the first wheel 14 and the second wheel 15, and opposite the first return segment 18.

Although the embodiments described here refer to a caterpillar-type drawing apparatus 11, the work apparatus 41 and in particular the guiding and holding means 47 described above are configured to operate with any type of drawing apparatus known to a person of skill in the art.

The first drawing unit 12 and the second drawing unit 13 can have a plurality of drawing wheels aligned in the direction of feed Z.

The drawing wheels can be adjustable to define the height of the drawing channel 19.

The drawing channel 19 can be defined at the lower part by the seatings 26b, which define the vertical positioning of the metal product P, and at the upper part by a rounded transverse profile.

According to a first embodiment, shown in FIG. 1, the work machine 10 can comprise a supply apparatus 48 positioned upstream of the drawing apparatus 11 and configured to supply, on each occasion, a metal product P to the drawing apparatus 11.

The supply apparatus 48 can comprise at least one support bench 49 of the metal products P and a removal device 50 of the metal products P.

The supply apparatus 48 also comprises a feed device 51 to feed the product P removed to the drawing apparatus 11.

The feed device 51 can comprise at least a pair of opposite drawing rollers 52, configured to receive the metal product P and transfer it to the drawing apparatus 11 in the direction of feed Z.

According to a second embodiment, shown in FIGS. 15-19, the work machine 10 can comprise a known supply apparatus, not shown, positioned upstream of the drawing apparatus 11.

There is a secondary cutting unit 53 upstream of the drawing apparatus 11, configured to perform, on each occasion, the head-wise or tail-wise butting of the metal products P.

The secondary cutting unit 53 is defined so as to perform correct cuts of the head end and the tail end of the metal products P.

The secondary cutting unit 53 is the bilateral type and comprises opposite cutting means consisting of two upper cutting edges 53a and 53b and two lower cutting edges 53c and 53d, at least one of which is mobile to butt the metal products P.

The upper cutting edge 53b and the lower cutting edge 53d are configured to cut the head end of the at least one metal product P.

The upper cutting edge 53a and the lower cutting edge 53c are configured to cut the tail end of the metal product P.

The importance of the two ends is described in the method according to the present invention.

In particular, the cuts become important when it is desired that a metal product P is thrust by the desired value by the following metal product P, as for example in FIG. 19.

This is fundamental both to guarantee a homogeneous feed of the metal products P in the direction of feed Z, as well as to work metal products P together which have the same length, avoiding different and uneven bends.

According to embodiments described here, the machine 10 comprises upstream of the drawing apparatus 11 at least one introduction member 37 (FIG. 2), and downstream of the drawing apparatus 11 the guide means 39 (FIGS. 2 and 11) provided to control, and possibly coordinate, the exit of the at least one metal product P from the drawing apparatus 11 toward the work apparatus 41.

Advantageously, the guide means 39 are adjustable in relation to the size of the metal products P.

According to possible solutions of the present invention, the work machine 10 comprises at least one detector 54 configured to detect at least the head and tail ends of the at least one metal product P, and consequently determine the actuation modes of the components of the work machine 10.

The detector 54 can be installed directly upstream of the drawing apparatus 11, or between the drawing apparatus 11 and the supply apparatus 48, or downstream of the drawing apparatus 11.

According to a possible solution of the invention, the drawing apparatus 11 can comprise a control and management unit, not shown, connected to the supply apparatus 48, to the detector 54, to the drawing apparatus 11, to the work apparatus 41 to manage and command the actuation modes of the various apparatuses and determine the sequence of operations to be performed on the at least one metal product P.

The work machine 10 can be configured to process metal products P in the form of segments of predetermined length, for example, a length comprised between 5 m and 24 m.

By way of example only, FIGS. 7-10 show an operating sequence of the functioning of the work machine 10 according to the present invention.

In particular, with reference to FIG. 7, a first metal product P is moved by the drawing apparatus 11 toward the work apparatus 41.

During this operating step, the first drawing unit 12 and the second drawing unit 13 are pressed, one toward the other, to exert a pressure on the metal product P which passes, during use, through them.

The pressure exerted through the first return segments 18 prevents a rotation of the metal product P on itself, for example during the bending operations which are performed by the bending device 42.

Furthermore, the pressure of the first return segments 18 on the metal product P, if the drive members 17 are deactivated, allows to clamp the metal product P, preventing it from advancing in the axial direction, for example due to the drawing action which is induced by the bending device 42.

While the bends are being made, it is also possible to clamp the metal product P with the guiding and holding means 47 to constrain its position.

When a tail end of the metal product P, shown in FIG. 7 with the reference "E", is in the drawing apparatus 11, a second metal product P has already begun to be removed with the removal device 50. In particular, the removal device 50 removes the second metal product P from the support bench 49 and supplies it to the feeding device 51.

The feed device 51 moves the head end, indicated in the drawings by the reference "H", of the second metal product P toward the drawing apparatus 11.

The first drawing unit 12 and the second drawing unit 13 are distanced from each other to increase the sizes of the passage cross section of the drawing channel 19 and allow the insertion of the second metal product (FIG. 8).

Before the first drawing unit 12 and the second drawing unit 13 are reciprocally distanced, the guiding and holding means 47 are activated to clamp the first metal product P and prevent it from rotating on itself or from losing its angular position in the direction of feed Z.

When the head end H of the second product P is in contact or proximity with the tail end E of the first product P (FIG. 9), the drawing apparatus 11 is closed, that is, the first drawing unit 12 and the second drawing unit 13 clamp, with the respective first return segments 18, both the first and second metal product P.

In this condition, the guiding and holding means 47 are deactivated and the drawing apparatus 11 can be driven to feed both metal products P toward the work apparatus 41.

In particular, once the first metal product P has exited with its tail end E from the drawing apparatus 11, that is, it is no longer gripped by the first return segments 18, its feed in the direction of feed Z is obtained by the thrust exerted by the head end H of the second metal product P.

The second metal product P is moved by driving the first drawing unit 12 and the second drawing unit 13.

The thrust exerted by the head end H allows the working to be completed and to discharge the metal product P from the guide means 39.

The guide means 39 allow to guide the movement of the metal product P toward the work apparatus 41, and therefore guarantees the reciprocal contact between the tail end E of the first metal product P and the head end H of the second metal product P.

With reference to FIGS. 15-19, some operating sequences of the machine 10 are shown according to the embodiments shown in FIGS. 11-14 according to which the machine 10 can work two metal products P together.

In this case, before supplying the metal products P to the drawing apparatus 11, advantageously a step of butting them with the secondary cutting unit 53 is performed. For this purpose, the secondary cutting unit 53 performs on each occasion the head and/or tail end butting of the at least one metal product P.

During the step of butting the tail end (FIG. 16), the first drawing unit 12 and the second drawing unit 13 are pressed one toward the other and the cutting of the tail end of the metal product P is performed with the upper cutting edge 53b and lower cutting edge 53d of the secondary cutting unit 53.

This allows to obtain a tail end cut to size, which is useful and necessary in certain operating methods according to the present invention.

During the step of butting the head end (FIG. 17) the first drawing unit 12 and the second drawing unit 13 are pressed, one toward the other and the cutting of the head end of the following metal product P is performed with the upper cutting edge 53b and lower cutting edge 53d of the secondary cutting unit 53.

By using one or the other cutting mean it is possible to obtain metal products P of the desired length and to make the head and/or tail surface usable, on each occasion, to cooperate with another possible and following or preceding metal product P.

In particular, the thrust exerted by the head end of the following metal product P allows the correct positioning of the preceding metal product P to complete the working.

When the last bend on a metal product P has to be performed, a following metal product P is used to axially position the preceding metal product P in correspondence with the bending device 42 and the guiding and holding means 47 are driven to function at least temporarily also as a contrast element during bending.

According to one aspect of the present invention, shown by way of example in FIG. 15, to retract the at least one metal product P, which has at least one bend in a position of interference with the guiding and holding means 47 and/or with the bending device 42, the guiding and holding means 47 and the bending device 42 are lowered, allowing to retract the metal product P until it is in the proximity of the main cutting unit 45.

Furthermore, to make a shaped product with the metal product P which has the terminal segment of the last bend comprised between about 4 cm and about 7 cm, the metal product P is retracted, after the guiding and holding means 47 and the bending device 42 have been removed from the work plane, before the main cutting unit 45 intervenes to separate the shaped product, just made, from the metal product P.

FIG. 18 shows a working step similar to that described above with reference to FIG. 8.

FIG. 19 shows the thrust step exerted by the head end H of the following metal product P to allow the completion of the working of the preceding metal product P, once the latter has exited with its tail end E from the return segments 18 of the drawing apparatus 11.

It is clear that modifications and/or additions of parts may be made to the machine 10 to work metal products P as described heretofore, without departing from the field and scope of the present invention.

For example, the drawing apparatus 11 can be configured to draw a plurality of metal products P side by side in the direction of feed Z.

According to a first variant embodiment, the drawing apparatus 11 can comprise a plurality of first drawing units 12 cooperating with corresponding second drawing units 13, as defined above. The first drawing units 12 can be put side by side in a direction orthogonal to the direction of feed Z. In the same way the second drawing units 13 can be put side by side in a direction orthogonal to the direction of feed Z. In this case each pair of chains of a first drawing unit and a corresponding second drawing unit can define respective drawing channels 19 for the transit of a respective metal product P.

According to a second variant embodiment, the drawing apparatus 11 can comprise a single first drawing unit 12 and a corresponding second drawing unit 13, and the anchoring inserts 21 associated with the chains 16 of the first 12 and second 13 drawing units are provided with a plurality of gripping grooves 23 disposed side by side and in each of which a metal product P can be housed.

It is also clear that, although the present invention has been described with reference to some specific examples, a person of skill in the art shall certainly be able to achieve many other equivalent forms of machine 10 to work metal products, having the characteristics as set forth in the claims and hence all coming within the field of protection defined thereby.

In the following claims, the sole purpose of the references in brackets is to facilitate reading: they must not be considered as restrictive factors with regard to the field of protection claimed in the specific claims.

The invention claimed is:

1. A machine to work oblong metal products, comprising a drawing apparatus (11) configured to feed at least one of said metal products (P) in a direction of feed (Z) and a work apparatus (41), provided with a work plane (41a), in which a bending device (42) is present provided with a contrast element (43), having at least one cylindrical vertical wall, and a bending element (44), positioned downstream of said drawing apparatus (11), aligned in said direction of feed (Z), said drawing apparatus (11) comprising a first drawing unit (12) and a second drawing unit (13) opposite each other with respect to said direction of feed (Z) and at least one drive member (17) to move said drawing apparatus (11) and in which said first drawing unit (12) and said second drawing unit (13) define between them, in said direction of feed (Z), a drawing channel (19) for the at least one metal product (P), wherein, at exit from said drawing channel (19) it includes a guide tube (39), adjustable on a plane orthogonal to a lying plane of said drawing channel (19), followed by a main cutting unit (45) and said bending device (42),
  wherein upstream of said drawing apparatus (11) there is a secondary cutting unit (53) configured to perform a head-wise or tail-wise butting of the at least one metal product (P), and
  wherein said secondary cutting unit (53) is a bilateral type and comprises opposite cutting means consisting of two upper cutting edges (53a, 53b) and two lower cutting edges (53c, 53d), wherein said upper cutting edge (53b) and said lower cutting edge (53d) are configured to perform the cutting of a head end of the at least one metal product (P), and said upper cutting edge (53a) and said lower cutting edge (53c) are configured to perform the cutting of a tail end of said metal product (P).

2. The machine as in claim 1, wherein said drawing plane of said drawing channel (19) is defined by a plurality of anchoring inserts (21), for the at least one metal product (P), tangent to the cylindrical vertical wall of said contrast element (43) being coherent with said work plane (41a), a supply apparatus (48) being possibly present upstream of said drawing apparatus (11).

3. The machine as in claim 1, wherein said drawing apparatus (11) has at least one position adjustable in a direction orthogonal to said direction of feed (Z) relative to said work plane (41a), so that the position of said at least one metal product (P) is coherent with said work plane (41a).

4. The machine as in claim 1, wherein said first drawing unit (12) and said second drawing unit (13) each comprise a first wheel (14) and a second wheel (15) and a chain (16) wound in a closed ring between said first wheel (14) and said second wheel (15), said drawing channel (19) being defined by an opposite plurality of upper anchoring inserts (21a) and lower anchoring inserts (21b), wherein said lower anchoring inserts (21b) have at least one flat transverse seating (26b), an aligned plurality of which constitutes the lying plane for the at least one metal product (P), to define a vertical positioning of the at least one metal product (P), said upper anchoring inserts (21a) having a rounded transverse profile such that a reciprocal thrust is applied on the metal products (P) toward a central longitudinal axis of said drawing channel (19) and toward said lower anchoring inserts (21b).

5. The machine as in claim 1, wherein said first drawing unit (12) and said second drawing unit (13) have a plurality of drawing wheels aligned in said direction of feed (Z), said drawing wheels being adjustable to define the height of said drawing channel (19), said drawing channel (19) being defined at a lower part by seatings (26b) which define the vertical positioning of the at least one metal product (P) and at an upper part by a rounded transverse profile.

6. The machine as in claim 4, wherein at least said upper anchoring inserts (21a) are provided with a gripping groove (23), for the at least one metal product (P), defined by tapered portions (25) which narrow from the sides toward a central portion (26), wherein the central portion (26) of said gripping groove (23) comprises inclined sides (26a) and said seating (26b), defined by said rounded profile, located between them.

7. The machine as in claim 4, wherein said upper anchoring inserts (21a) and said lower anchoring inserts (21b) cooperate laterally with anchoring links (66), said anchoring links (66) supporting and positioning said chains (16), said chains (16) being slidable on contrasting bodies (31) of the first drawing unit (12) and of the second drawing unit (13).

8. The machine as in claim 7, wherein at least one of said contrasting bodies (31) cooperates elastically with a respective support body (32) by means of elastic elements (34).

9. A method to work at least one metal product (P) using a machine according to claim 1, wherein when a last bend is to be made on a metal product (P), a following metal product (P) is used to axially position the previous metal product (P) in correspondence with the bending device (42) and guiding and holding means (47) are driven to at least temporarily act also as a contrast element during the bending.

10. The method as in claim 9, wherein in order to retract the at least one metal product (P), which has at least one bend in a position of interference with said guiding and holding means (47) and/or with said bending device (42), said guiding and holding means (47) and said bending device (42) are lowered, allowing to retract said metal product (P) up to the proximity of the main cutting unit (45).

11. The method as in claim 9, wherein a secondary cutting unit (53) performs a head-wise or tail-wise butting of the at least one metal product (P).

12. The method as in claim 9, wherein in order to make a shaped product with the metal product (P) which has a terminal segment of the last bend comprised between 4 cm and 7 cm, the metal product (P) is retracted, after said guiding and holding means (47) and said bending device (42) have been removed from the work plane (41a), before the main cutting unit (45) is made to intervene to separate the shaped product from said metal product (P).

13. A machine to work oblong metal products, comprising a drawing apparatus (11) configured to feed at least one of said metal products (P) in a direction of feed (Z) and a work apparatus (41), provided with a work plane (41a), in which a bending device (42) is present provided with a contrast element (43), having at least one cylindrical vertical wall, and a bending element (44), positioned downstream of said drawing apparatus (11), aligned in said direction of feed (Z), said drawing apparatus (11) comprising a first drawing unit (12) and a second drawing unit (13) opposite each other with respect to said direction of feed (Z) and at least one drive member (17) to move said drawing apparatus (11) and in which said first drawing unit (12) and said second drawing unit (13) define between them, in said direction of feed (Z), a drawing channel (19) for the at least one metal product (P), wherein, at exit from said drawing channel (19) it includes a guide tube (39), adjustable on a plane orthogonal to a lying plane of said drawing channel (19), followed by a main cutting unit (45) and said bending device (42), wherein at an exit from said main cutting unit (45) there are guiding and holding means (47) consisting of branches (60, 61), said guiding and holding means (47), lying on the same plane, being autonomous and adjustable, directly cooperating with said bending device (42), having profiles with an extension which reaches a proximity of the center of said contrast element (43) of said bending device (42), said contrast element (43) having a cylindrical portion with an axis of rotation and a flat portion close to said axis of rotation, said flat portion facing the guiding and holding means (47).

14. The machine as in claim 13, wherein said branch (61), which cooperates directly with said contrast element (43), has a wall orthogonal to said work plane (41a) and tangent to the cylindrical vertical wall of said contrast element (43) cooperating with the flat portion of said contrast element (43).

15. The machine as in claim 13, wherein said branch (60) has, in a part that faces a wall orthogonal to said work plane (41a) of said branch (61), an extension toward said branch (61) such that a thrust is exerted downward and toward said branch (61).

16. The machine as in claim 13, wherein said guiding and holding means (47) and at least said contrast element (43) are mobile to retract with respect to the work plane, between a working condition and a condition of non-interference.

17. The machine as in claim 13, wherein said branches (60, 61) are facing each other and positioned at an adjustable distance with respect to each other in order to pass from a gripping position, which allows the clamping and axial positioning of the at least one metal product (P) at least during the bending operation, to a release and guiding position of the at least one metal product (P) in order to move it.

18. The machine as in claim 13, wherein the profile of said guiding and holding means (47) is reduced in the direction of said contrast element (43), having a flared shape in said direction of feed (Z).

19. A method to work at least one metal product (P) using a machine according to claim 13, wherein when a last bend is to be made on a metal product (P), a following metal product (P) is used to axially position the previous metal product (P) in correspondence with the bending device (42)

and guiding and holding means (47) are driven to at least temporarily act also as a contrast element during the bending.

20. The method as in claim 19, wherein in order to retract the at least one metal product (P), which has at least one bend in a position of interference with said guiding and holding means (47) and/or with said bending device (42), said guiding and holding means (47) and said bending device (42) are lowered, allowing to retract said metal product (P) up to the proximity of the main cutting unit (45).

21. The method as in claim 19, wherein a secondary cutting unit (53) performs a head-wise or tail-wise butting of the at least one metal product (P).

22. The method as in claim 19, wherein in order to make a shaped product with the metal product (P) which has a terminal segment of the last bend comprised between 4 cm and 7 cm, the metal product (P) is retracted, after said guiding and holding means (47) and said bending device (42) have been removed from the work plane (41*a*), before the main cutting unit (45) is made to intervene to separate the shaped product from said metal product (P).

\* \* \* \* \*